US008874584B1

(12) United States Patent
Chen et al.

(10) Patent No.: US 8,874,584 B1
(45) Date of Patent: Oct. 28, 2014

(54) HIERARCHICAL VIDEO SEARCH AND RECOGNITION SYSTEM

(75) Inventors: Yang Chen, Westlake Village, CA (US); Swarup Medasani, Thousand Oaks, CA (US); David L. Allen, Westlake Village, CA (US); Qin Jiang, Oak Park, CA (US); Yuri Owechko, Newbury Park, CA (US); Tsai-Ching Lu, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 543 days.

(21) Appl. No.: 12/660,320

(22) Filed: Feb. 24, 2010

(51) Int. Cl.
*G06F 17/30* (2006.01)

(52) U.S. Cl.
USPC .......................................................... 707/741

(58) Field of Classification Search
USPC ................................................. 707/724, 725
See application file for complete search history.

(56) References Cited

U.S. PATENT DOCUMENTS

| | | | | |
|---|---|---|---|---|
| 5,969,755 | A * | 10/1999 | Courtney ....................... | 348/143 |
| 6,956,573 | B1 * | 10/2005 | Bergen et al. ................. | 345/473 |
| 2007/0263900 | A1 * | 11/2007 | Medasani et al. ............. | 382/103 |

OTHER PUBLICATIONS

C.Ko Dagli, et al., "Utilizing information theoretic diversity for SVM active learning," in IAPR ICPR 2006. pp. 1-6.*
X. Yan, et al., "Graph indexing: A frequent structure-based approach," In Proc. 2004 ACM SIGMOD int. Conf. Management of Data (SIGMOD'04), pp. 335-346, Paris, France, Jun. 2004.
X. Yan, et al., "Graph indexing based on discriminative frequent structure analysis," ACM Trans. Database Systems, 30:960-993, 2005.
X. Yan, et al., "Substructure similarity search in graph databases," In Proc. 2005 ACM-SIGMOD int. Conf. Management of Data (SIGMOD'05), pp. 766-777, Baltimore, MD, Jun. 2005.
X. Yan, et al., "Feature-based substructure similarity search," ACM Trans. Database Systems, 31:1418-1453, 2006.
J. Cheng, et al., "Fg-index: towards verification-free query processing on graph databases," In Proc. of the 2007 ACM-SIGMOD, International Conference on Management Data, Jun. 2007, Beijing, China.
D. Nister, et al., "Scalable recognition with a vocabulary tree," In Proc. Of CVPR 2006.
C.K. Dagli, et al., "Utilizing information theoretic diversity for SVM active learning," in IAPR ICPR 2006.
P. Scovanner, et al., "A 3-dimensional descriptor and its application to action recognition," Proceedings of the 15th international conference on Multi-Media, pp. 357-360 (ACM MultiMedia'07), Augsburg, Germany, Sep. 23-28, 2007.

(Continued)

*Primary Examiner* — Rehana Perveen
*Assistant Examiner* — Hung Havan
(74) *Attorney, Agent, or Firm* — Tope-McKay & Associates (57) ABSTRACT

Described is a system for content recognition, search, and retrieval in visual data. The system is configured to perform operations of receiving visual data as an input, processing the visual data, and extracting distinct activity-agnostic content descriptors from the visual data at each level of a hierarchical content descriptor module. The resulting content descriptors are then indexed with a hierarchical content indexing module, wherein each level of the content indexing module comprises a distinct set of indexed content descriptors. The visual data, generated content descriptors, and indexed content descriptors are then stored in a storage module. Finally, based on a content-based query by a user, the storage module is searched, and visual data containing the content of interest is retrieved and presented to the user. A method and computer program product for content recognition, search, and retrieval in visual data are also described.

18 Claims, 7 Drawing Sheets

(56) References Cited

OTHER PUBLICATIONS

E. Shechtman, et al., "Matching local self-similarities across images and videos," in Proc. Of CVPR 2007.

A. Gionis, et al., "Similarity search in high dimensions via hashing," Proc. Int. Conf. Very Large Databases, pp. 518-529, 1999.

Pierre Comon, "Independent Component Analysis: a new concept?," Signal Processing, Elsevier, 36(3):287-314, 1994.

* cited by examiner

HIERARCHICAL VIDEO SEARCH AND RECOGNITION SYSTEM

BACKGROUND OF THE INVENTION (1) Field of Invention

The present invention relates to a system for content recognition, search, and retrieval in visual data and, more particularly, to a system for content recognition, search, and retrieval in visual data which combines multi-level descriptor generation, hierarchical indexing, and active learning-based query refinement.

(2) Description of Related Art

Content-based video retrieval is the application of computer vision to the video image retrieval problem (i.e., the problem of searching for digital images in large databases). The term "content-based" refers to the fact that the search will analyze the actual contents of the images in the video, such as colors, shapes, textures, activities, events, or any other type of information that can be retrieved from the video images.

Currently, the ability to efficiently perform a video search based on contents in terms of activities or events is lacking. The need for rapid and accurate video search and monitoring cannot be met with the current labor-intensive methods. State-of-the-art techniques for video object and activity classification require extensive training on large datasets with manually annotated ground truth and are often brittle to slight changes in illumination, view angle, movement, and the environment. Existing content-based video search capabilities rely on meta data that are provided by human annotation, which is labor intensive and non-practical for large video databases.

Although content-based image retrieval has been a focus of research for many years, most of the approaches are focused on using statistical information content in the images and are not directly applicable to video retrieval, since it is non-trivial to accurately model and recognize the dynamically changing video content and context. Although visual vocabulary approaches for image retrieval showed great potential for handling images, such approaches have not been extended to videos. Similarly, spatio-temporal descriptors have been developed for action recognition and classification, but these descriptors have been used only to model and classify activities and not for efficient video search and retrieval. Current systems, as will be described in further detail below, make the problem of activity recognition and search in videos complex and unwieldy. Furthermore, the current search and retrieval methods cannot scale to efficiently index and retrieve video of interest from large video repositories in a few seconds.

For example, Schetman and Irani describe an approach for matching activity descriptions in video using local self-similarity descriptors in "Matching Local Self-Similarities Across Images and Videos" in Institute of Electronics and Electrical Engineers (IEEE) Conference on Computer Vision and Pattern Recognition, 2007. The matching algorithm described is based on optimization of a distance function and cannot be scaled to large video archives.

In "Video Retrieval Using Spatio-Temporal Descriptors" in Association for Computing Machinery, pp. 508-517, 2003, DeMenthon and Doermann present a method using a binary tree approach by clustering image region features and region velocity vectors. However, the region descriptor described by DeMenthon and Doermann is more global in nature and region-based, requiring segmentation. The approach described by the authors does not address search scalability.

Furthermore, related art is described by Sivic and Zissermen in "Video Google: A Text Retrieval Approach to Object Making in Videos" in Proceedings of the IEEE International Conference on Computer Vision, 2003 and by Nister and Stewenius in "Scalable Recognition with a Vocabulary Tree" in IEEE Conference on Computer Vision and Pattern Recognition, vol. 2, pp. 2161-2168, 2006. These two references present visual vocabulary and vocabulary tree approaches, respectively, for searching images in image archives using two-dimensional image descriptors. However, the references do not disclose the use of spatio-temporal descriptors, nor do they propose searching videos based on activity contents.

Finally, additional related art is presented by Scovanner et al. in "A 3-Dimensional SIFT Descriptor and its Application to Action Recognition" in Proceedings of Multimedia, pp. 357-360, 2007, Niebles et al. in "Unsupervised Learning of Human Action Categories Using Spatial-Temporal Words" in British Machine Vision Conference, 2006, and Dollar et al. in "Behavior Recognition Via Sparse Spatio-Temporal Features" in IEEE International Workshop on Visual Surveillance and Performance Evaluation of Tracking and Surveillance, pp. 65-72, 2005. All of these references describe approaches using spatio-temporal descriptors for human action recognition. Each of the approaches presented in the references require labeled data for training classifiers. These approaches also do not address how the spatio-temporal descriptors can be used for video search. Each of the references referred to above and below is hereby incorporated by reference as though fully set forth herein.

Thus, a continuing need exists for a system which allows rapid and efficient content recognition, search, and retrieval in visual data for content which is based on activities or events using only unlabeled data and unsupervised training.

SUMMARY OF THE INVENTION

The present invention relates to a system for content recognition, search, and retrieval in visual data comprising one or more processors that are configured to perform operations of receiving visual data as an input and extracting a set of activity-agnostic content descriptors from the visual data with a hierarchical content descriptor module having a plurality of levels, resulting in a set of activity-agnostic generated content descriptors. Each level of the content descriptor module generates a distinct set of content descriptors. Furthermore, the activity-agnostic generated content descriptors are indexed with a hierarchical content indexing module having a plurality of levels, resulting in a set of indexed content descriptors. Each level of the content indexing module comprises a distinct set of indexed content descriptors. Additionally, the visual data, the set of generated content descriptors, and the set of indexed content descriptors are stored in a storage module. The storage module is searched for visual data containing a content of interest based on a user query. The user query is then refined using an active learning model based on a set of feedback from a user. Finally, the visual data containing the content of interest is presented to the user.

In another aspect, the query is a video clip containing a content of interest.

In another aspect, the system is further configured to compare a set of generated activity-agnostic content descriptors from the video clip to the set of generated activity-agnostic content descriptors in the storage module to retrieve a match.

In another aspect, the hierarchical content descriptor module comprises a first level for detecting a set of salient spatiotemporal regions which are abstracted into a set of activity-agnostic spatiotemporal visual words, wherein a collection of each of the sets of activity-agnostic spatiotemporal visual words form a visual vocabulary.

In yet another aspect, the hierarchical content descriptor module comprises a second level for modeling a set of motion trajectories of at least one moving object or salient blob in the visual data.

In another aspect, the hierarchical content descriptor module comprises a third level which employs a set of graphical activity representations.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform said operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for content recognition, search, and retrieval in visual data and, more particularly, to a system for content recognition, search, and retrieval in visual data which combines multi-level descriptor generation, hierarchical indexing, and active learning-based query refinement. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction.

Instead, they are used to reflect relative locations and/or directions between various portions of an object. As such, as the present invention is changed, the above labels may change their orientation.

(1) Principal Aspects

The present invention has three "principal" aspects. The first is a system for content recognition, search, and retrieval in visual data. The system is typically in the form of a computer system, computer component, or computer network operating software or in the form of a "hard-coded" instruction set. This system may take a variety of forms with a variety of hardware devices and may include computer networks, handheld computing devices, such as cell phones and personal digital assistant (PDA), cellular networks, satellite networks, and other communication devices. As can be appreciated by one skilled in the art, this system may be incorporated into a wide variety of devices that provide different functionalities. The second principal aspect is a method for content recognition, search, and retrieval in visual data, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), random access memory, and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Specific Details

The present invention describes a system for activity recognition and search in visual data that synergistically combines generic descriptor generation, efficient indexing methods, and active learning-based relevance feedback mechanisms. In a desired aspect, the approach is based on an extensible architecture for event and activity recognition and search in videos including a multi-level set of activity-agnostic content descriptors (i.e., descriptors which are not dependent on the specific types of activity the system is capable of handling), hierarchical and graph-based indexing, and active learning models for query refinement. The invention presented herein makes it possible to search for new, previously unknown events and activities in an archive or live stream of video data using only unlabeled data and unsupervised training. Such a tool can be used to improve performance and add capabilities to a wide variety of vision systems, non-limiting examples of which include automotive and commercial vision systems.

Figure 1:
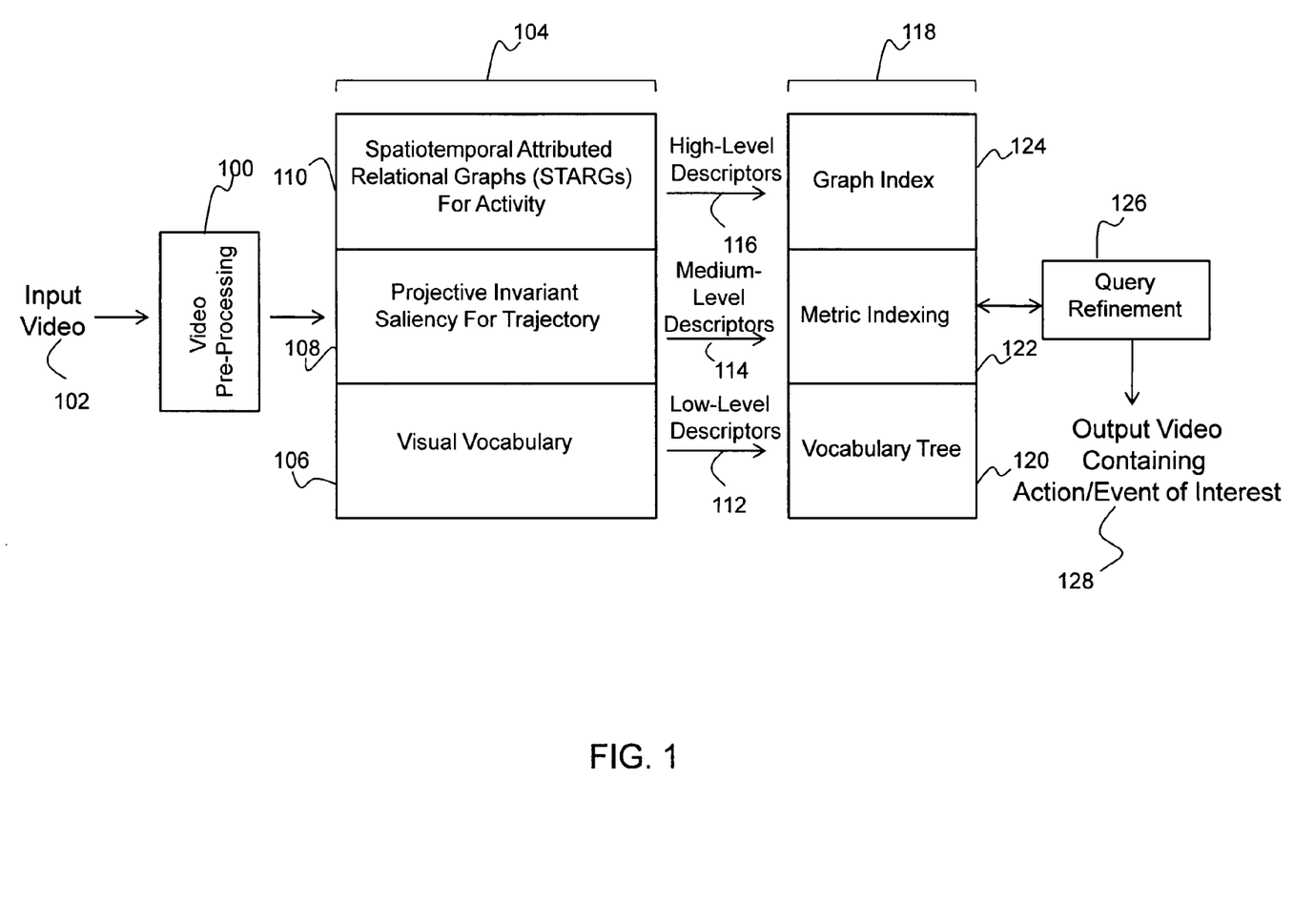
FIG. 1 is a flow chart illustrating content recognition, search, and retrieval in visual data, depicting a content descriptor module and a content indexing module according to the present invention.

A diagram of the system architecture is illustrated in FIG. 1. Video content descriptor generation begins with a video pre-processing module 100, which receives visual data (e.g., video) as an input 102. The purpose of the video pre-processing module 100 is to stabilize and geo-register input videos 102 as well as extract moving objects along with their associated features, non-limiting examples of which include shape, size, color, kinematics (e.g., motion trajectories), and coarse classification. Geo-registration refers to the process of alignment and correlation of images to allow for comparison of multiple images from different sensors, times, or viewing perspectives.

Once a set of motion trajectories are extracted, a multi-level, hierarchical content descriptor module 104 begins to extract descriptors at multiple levels 106, 108, and 110 in the content descriptor module 104. The information content in a video clip from an input video 102 is modeled using a hierarchical representation with individual pixels at the lowest level 106, moving object tracks at the medium level 108, and graphical activity representations at the highest level 110. The different levels 106, 108, and 110 in the content descriptor module 104 provide complementary and progressively more detailed information. In addition, each level 106, 108, and 110 in the content descriptor module 104 uses representations and indexing schemes which focus on the pertinent substructures that exist at each level 106, 108, and 110, which will be described in more detail below. Once a set of activity-agnostic multi-level descriptors 112, 114, and 116 are generated, a parallel content indexing module 118 builds hierarchical indexes 120, 122, and 124 corresponding to the descriptor levels 106, 108, and 110, which will be described in further detail below. The multi-level set of activity-agnostic content descriptors 112, 114, and 116 provides multiple representations for activity search.

In the lowest level 106 of the content descriptor module 104, salient spatiotemporal regions of the video clip from the input video 102 are first detected and then abstracted into so called "visual words," which are spatiotemporal feature representation of local regions in the video. The elicited visual words are activity-agnostic (i.e., unrelated to any particular activity) and are analogous to the textual keywords that common search engines use for retrieving documents. An example of such a search engine is Google™, produced by Google Inc. located at 1600 Amphitheatre Parkway, Mountain View, Calif. 94043. A collection of all the visual words can be abstracted into a visual vocabulary 106 which represents activities and/or events. The visual words and generated visual vocabulary are non-limiting examples of low-level descriptors 112 generated by the content descriptor module 104. The visual vocabulary is stored using hierarchical tree structures (i.e., vocabulary trees 120) that unify quantization and indexing into a single unique representation enabling rapid search.

Typically, the visual vocabulary for a particular domain is extracted during an off-line training phase from generic videos pertinent to that domain. Two-dimensional image descriptors from training images are computed and clustered hierarchically to form a tree. Each node in the tree can be seen as representing a "virtual" descriptor that is the vector mean of the descriptors it represents. Each of the leaf nodes represents a set of descriptors coming from similar image features which are called "visual words," and the set of all leaf nodes form the "visual vocabulary." Therefore the tree is called a "vocabulary tree."

Additionally, there is not a need for any ground truth labels as to the actual contents in the videos. The visual vocabulary and its mapping to the vocabulary tree 120 are independent of an actual database of videos which are the subject for search. The only connection is a set of inverse lookup tables that are maintained at each of the nodes in the tree. This arrangement obviates the need to extract new visual words or re-index when new videos are added to the archive. Non-limiting examples of visual words include a person walking and a vehicle moving.

Previous studies by Nister and Stewenius in "Scalable Recognition with a Vocabulary Tree" in Proceedings of Computer Vision and Pattern Recognition, 2006, demonstrated the scalability of vocabulary trees by achieving sub-second retrieval time using commercial, off-the-shelf (COTS) personal computers on an archive with one million images. Demonstration of the present invention showed results with a $P_D$ (probability of detection) of 70% and a false alarm rate (FAR) of twelve per hour on a low-resolution version of the KTH human action dataset with six types of activities. The KTH human action dataset is a dataset for visual human action recognition. These results indicate that the vocabulary tree approach is capable of solving large scale search problems. All references described above and below are hereby incorporated by reference as though fully set forth herein.

Figure 2:
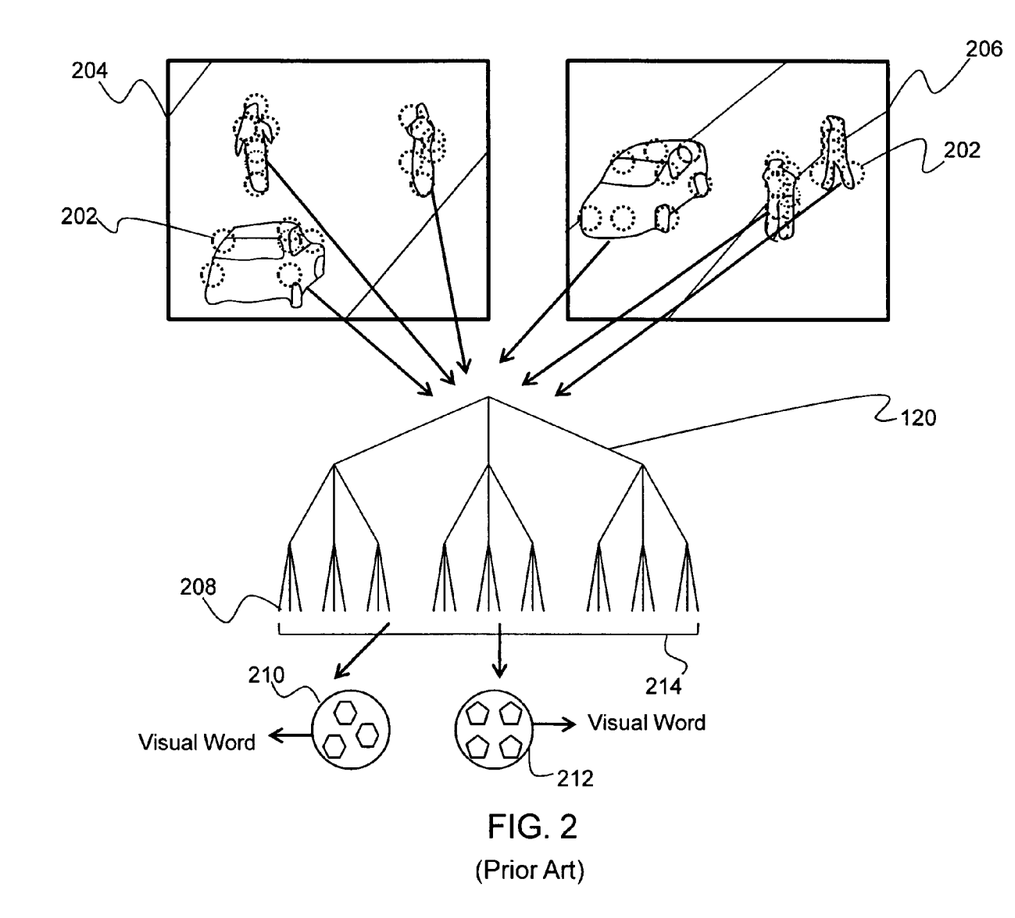
FIG. 2 is an illustration depicting construction of a visual vocabulary according to prior art.

FIG. 2 is an illustration depicting the process of building a vocabulary tree 120 for efficient search of video activities using spatiotemporal descriptors. Non-limiting examples of spatiotemporal descriptors for video activities include three-dimensional scale-invariant feature transform (SIFT) and local self-similarity measure. First, local spatial-temporal descriptors, which correspond to elliptical regions 202, are extracted from images 204 and 206 of a video containing activities. The descriptors are clustered hierarchically into groups based on similarity to form a vocabulary tree 120 having a plurality of nodes. A cluster prototype at each leaf node 208 becomes a visual word 210 and 212, which represents a feature common to many activities (e.g., person walking, automobile moving). A leaf node 208 is a node of a tree data structure (e.g., vocabulary tree 120) that has no child nodes and is typically furthest from the root node. The set of leaf nodes 214 becomes the visual vocabulary (106 of FIG. 1) of all activities.

Referring back to FIG. 1, the middle level 108 of the content descriptor module 104 models the motion trajectories of moving objects or salient blobs using sparse representations generated from projective invariant features. Blob detection in the field of computer vision refers to visual modules that are aimed at detecting points and/or regions in the image that are either brighter or darker than surrounding areas. Salient blobs are blobs which correspond to significant image structures (e.g., objects). Motion trajectories are a non-limiting example of medium-level descriptors 114. These canonical features are invariant to sensor viewpoint. Similarity matching of trajectories in the canonical representation space is computationally expensive, since the space is not metric. Motion trajectories, however, are a good source of complementary information for actions of objects (e.g., humans, automobiles) compared with the information in the low-level descriptors 112, since it captures the global motion patterns that the low-level descriptors 112 may have missed.

Furthermore, the middle level 108 of the hierarchical content descriptor module 104 uses an approach based on independent component analysis (ICA) to generate sparse signatures of object motion events, as first described by Comon in "Independent Component Analysis: A New Concept?" in Signal Processing, 36(3): 287-314, 1994. ICA is a computational method for separating a multivariate signal into additive subcomponents supposing the mutual statistical independence of non-Gaussian source signals. ICA efficiently estimates a sparse, unique multi-actor trajectory descriptor using generalized basis functions learned from unlabeled track data. The signatures are generated using a generalized set of basis functions or "event phonemes" learned in an unsupervised manner from unlabeled video data. Event phonemes are another non-limiting example of a middle-level descriptor 114. Once learned, these basis functions can be used to quickly catalog, recognize, and retrieve events (e.g., human walking, car moving) based on the ICA signatures for trajectories of multiple objects. The sparse signatures representing object motion events are essentially vectors of numbers and, therefore, can be indexed and searched using state-of-the-art metric indexing techniques 122 that are scalable to large datasets. A non-limiting example of such an indexing technique is locality sensitive hashing (LSH).

The highest level 110 of content description in the content descriptor module 104 employs graphical activity representations. In a desired aspect, the graphical activity representations are spatiotemporal attributed relational graphs (STARGs). The STARG representation scheme assumes very little about the underlying model of activity it represents. In the STARG representation described in the present invention, nodes represent objects and edges represent spatial and temporal relations. The STARG representation is not fixed. Rather the representation dynamically changes from frame to frame of an input video, evolving as the activities unfold.

A novel graph indexing approach 124 is used that builds the index structure from an ensemble of STARGs by automatically discovering discriminative co-occurring cliques using graph pattern mining methods. Non-limiting examples of graph pattern mining methods include apriori-based approaches (e.g., AGM, FSG, PATH) and pattern growth approaches (e.g., gSpan, Gaston). This innovation obviates the need for multiple indexes to be maintained corresponding to each potential sub-structure latent in the graph representation. Recent studies by Cheng et al. in "Fg-index: towards verification-free query processing on graph databases" in Proc. of the 2007 ACM SIGMOD International Conference on Management Data, 2007 have shown that graph indexing and search algorithms can retrieve graphs in milliseconds from an archive containing 100,000 graphs of an average size of 30 edges, the equivalent of STARGs, from 27.8 hours of video, assuming a one second sampling rate.

Figure 7:
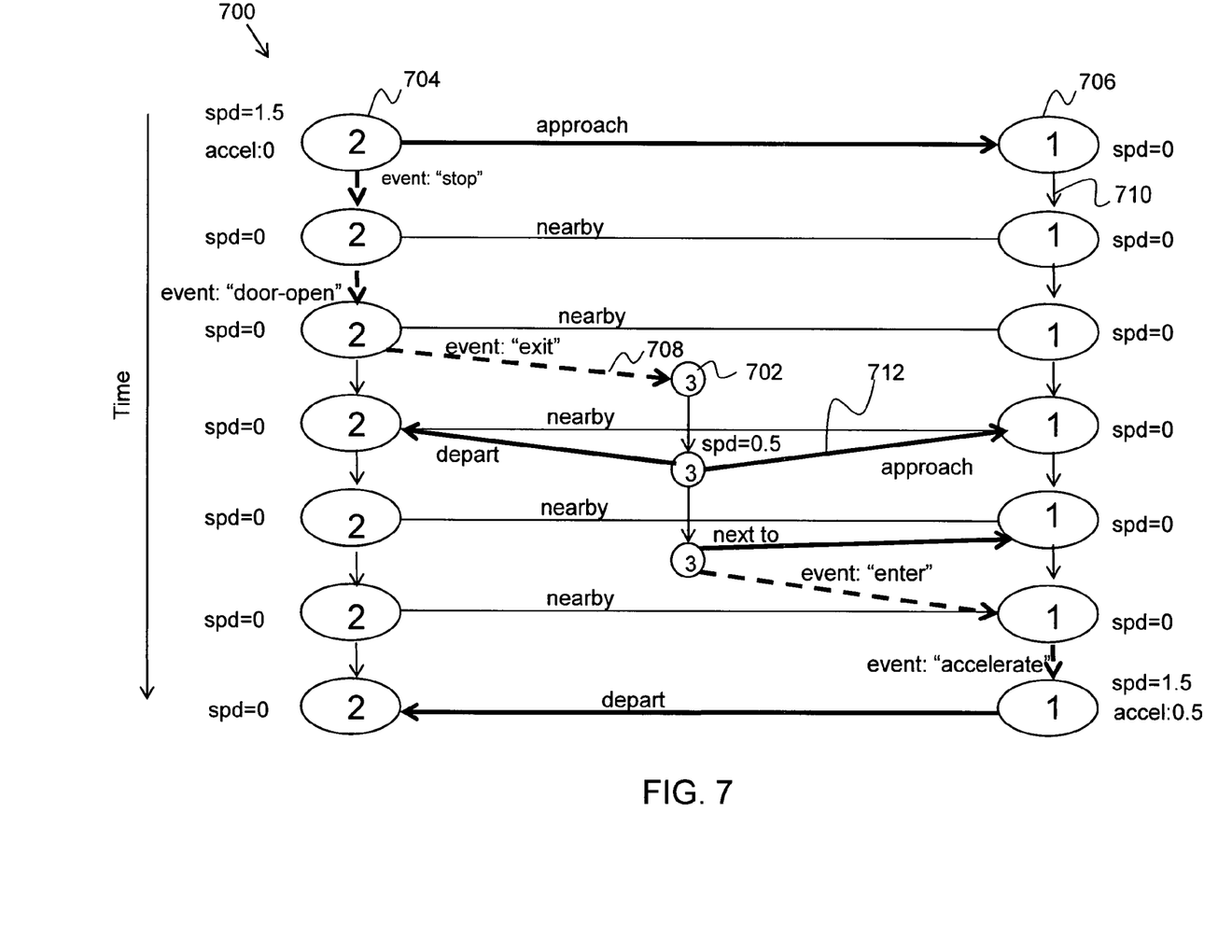
FIG. 7 depicts an example of a spatiotemporal attributed relational graph (STARG) for an activity according to the present invention.

With the hierarchical representation and indexing scheme described for the present invention, the benefit of having multiple representation and indexing schemes in parallel is to provide the most natural representation and efficient indexing scheme for a particular activity or event. For example, certain human actions only last a second or two and are therefore ideal for low-level 106 spatiotemporal representations. However, some activities, referred to as "pick-up" activities, contain multiple elementary actions which can last tens of seconds. As a non-limiting example, a "pick-up" activity may involve a person getting out of a car, getting into another car, and driving away. These types of activities are more appropriate for graph-based representation 110 and indexing 124 using STARGs. FIG. 7 depicts an example of a STARG 700 representing a "pick-up" activity in which a person ("3") 702 gets out of a car ("2") 704, and then gets into another ("1") 706, and drives away. In FIG. 7, "spd" denotes speed and "accel" denotes acceleration. Additionally, the dashed arrows 708 represent an event involving one or more entities over a period of time, the solid arrows 710 represent the temporal relationship of the same entity between different states, and the bold solid arrows 712 represent spatial relationships between entities.

Having multiple representation and index schemes can also benefit from the complementary features that make the overall system more robust. For instance, in the "pick-up" example described above, many of the low-level activities (e.g., person getting out of a car) can be represented by the spatiotemporal representation 106, while the whole sequence of events is captured in a dynamically evolving STARG 110.

The present invention also includes a query refinement module 126 for refining results based on a user's query. As a non-limiting example, the user's query is in the form of a video clip containing activities of interest. As will be described in further detail below, a search of a storage module, or archive, is performed to locate visual data (e.g., video) which contains the action or event of interest. Additionally, the query refinement module allows a user to provide feedback to refine the search results. The result of the search is then output to a user in the form of retrieved visual data containing the activity or event of interest 128.

Figure 3:
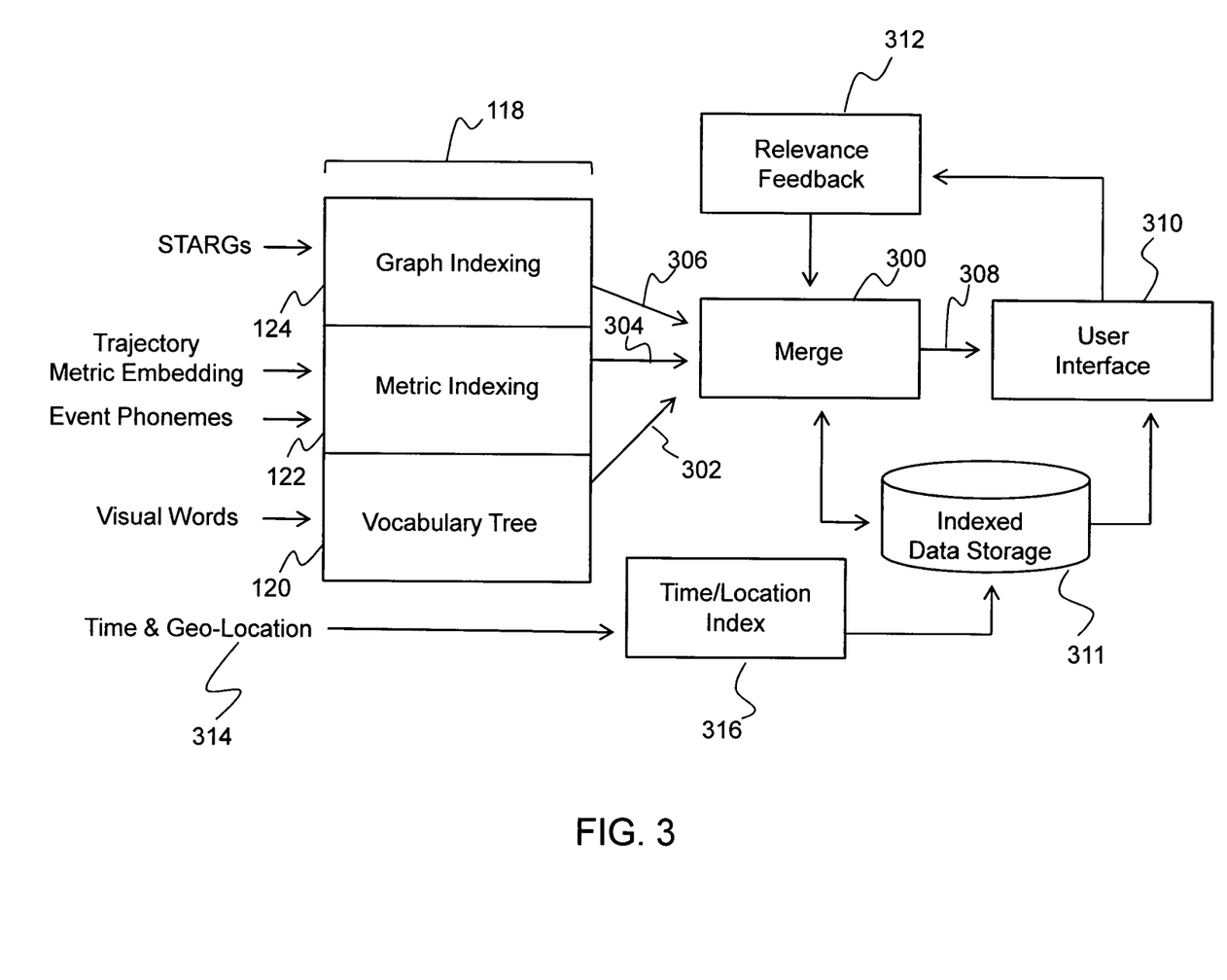
FIG. 3 is a flow chart illustrating content recognition, search, and retrieval in visual data depicting a content indexing module and query refinement according to the present invention.

As shown in FIG. 3, a final step in the query and search process is to combine, or merge 300, partial results 302, 304, and 306 from distinct levels 120, 122, and 124 of the content index module 118. Depending on the details of the database partitioning, this might involve union, intersection, or merging 300 partial results 302, 304, and 306 into complete results 308. Some of the indexing levels 120, 122, and 124 in the content index module 118 may sacrifice some accuracy to improve speed or storage. In addition, when queries have to be spread across multiple databases and indexes, some parts of the selection process cannot be performed solely within the separate databases. Any of these cases will require some final filtering to re-rank or block unwanted parts of the preliminary results during merging 300. Partial results 302, 304, and 306 from different levels 120, 122, and 124 of the index module 118 are merged 300 using efficient database management system schemes (e.g., network model, relational model) to produce more accurate search results 308 which are sent to a user interface 310. As will be described in further detail below, an indexed data storage 311 stores all relevant visual data needed for the system to function.

Because of the potential for the entire video archive to be very large, conventional approaches to database management system fragmentation can be employed in the present invention. A non-limiting example of a database management system fragmentation approach includes partitioning databases and indexes into subsets. An additional example includes fragmentation and reordering of processing steps based on features of specific queries, meta-data about the actual structure of the database, and the availability and selectivity of indexes to the query being processed. In addition to making individual systems more manageable, partitioning provides an opportunity for parallel execution. For example, standard geographic and temporal indexing to support queries with temporal and spatial constraints is one of the options for building subsets.

During a search process, the different levels of description weigh differently towards the final ranking of the search results 308 (e.g., a video containing content of interest matching the input video) depending on the contents of the activities and events present in the videos. These weights can be learned through a process called query refinement. Query refinement allows a user to provide relevance feedback 312 to the process through active learning based on relevance of search results 308 to a user's goal. In response to a query, search results 308 (i.e., relevance-ranked matches) are returned to the user through the user interface 310, and the user may provide feedback 312. Unsupervised learning methods can then be used to refine the query based on even simple feedback 312 (e.g., which are most relevant).

The approach to relevance feedback 312 in the present invention incorporates aspects of both query point movement and feature weighting. This novel query refinement approach uses an information-theoretic model of diversity and applies it to a rapid active learning scheme. This approach is more adaptive to the nature of the user in each successive feedback 312 round. The feature re-weighting framework uses the fuzzy integral (non-linear integral) to aggregate the importance of the different combinations of the feature values that are being used for similarity matching between videos. Time and geo-location input 314 are other potential inputs the search system can use to narrow the search results 308, if they are available as part of the query input. As can be appreciated by one skilled in the art, the time and geo-location input 314 can also be indexed 316 and stored in the indexed data storage 311.

Figure 4:
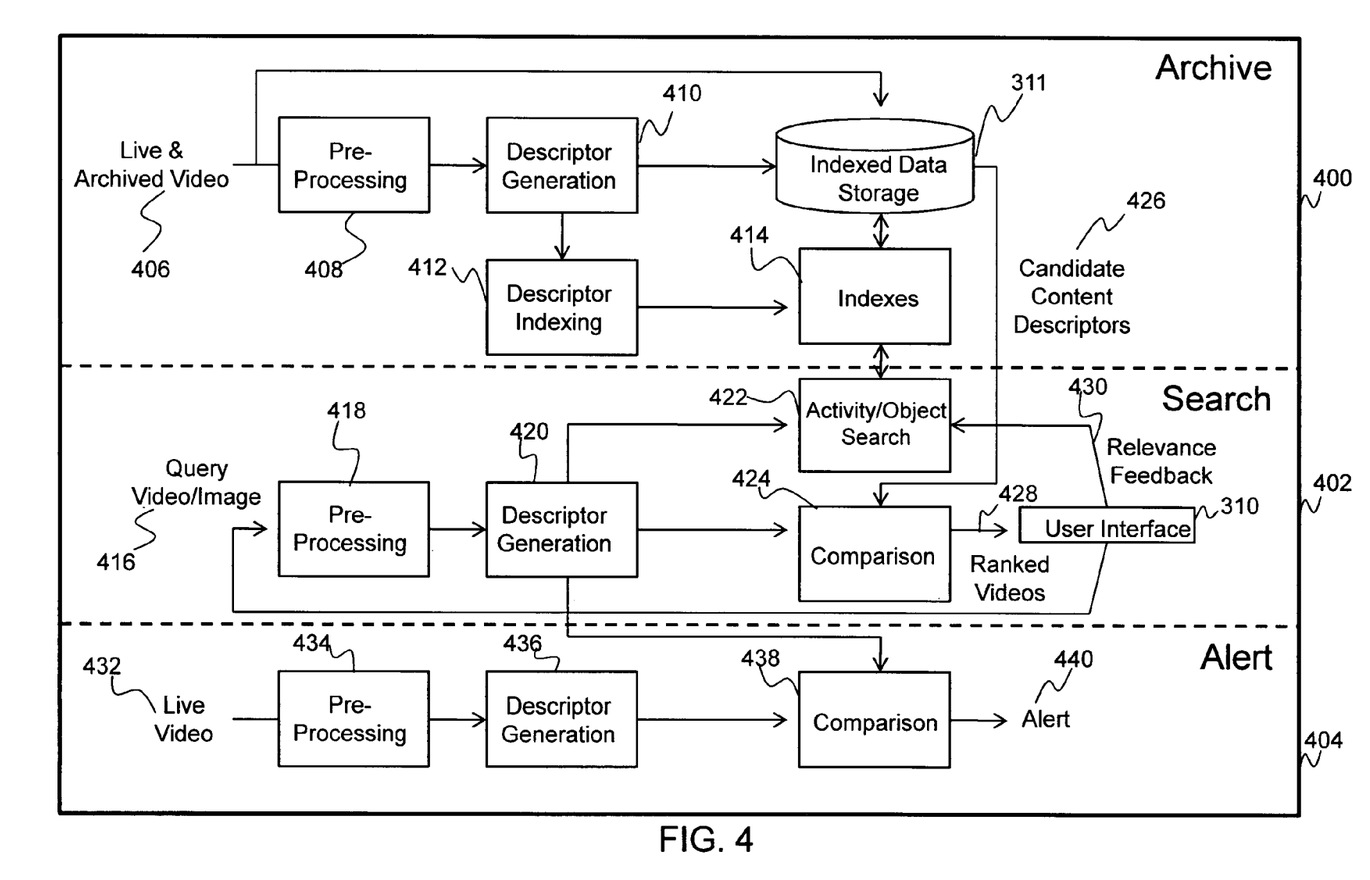
FIG. 4 is an illustration of a flow chart for content recognition, search, and retrieval in visual data depicting an archive process, a search process, and an alert mode according to the present invention.

FIG. 4 illustrates a flow diagram depicting an archive process 400, a search process 402, and an alert mode 404 utilized in the present invention. The pre-processing (FIG. 1, 100), descriptor generation (FIG. 1, 104), and descriptor indexing (FIG. 1, FIG. 1, 118) processes are described in detail above. In the non-limiting example of the archive process 400 depicted in FIG. 4, videos 406 are fed into the system as input, processed by a video pre-processing module 408, and then activity-agnostic content descriptors 410 are generated and indexed 412, as described above. The input video 406, generated descriptors 410, and generated indexes 414 are stored in the indexed data storage 311. The archive process 400 can operate independently of the search process 402, in order to provide real-time archive capability of video streams for efficient search at a later time.

During the search process 402, a user query 416 comes from a user interface. A non-limiting example of a user query 416 is samples of video clips containing content of interest (e.g., activities, events). The user query 416 (e.g., sample video clips) is processed by a pre-processing module 418 and activity descriptor generation 420 modules to describe the activity and object contents of the videos. The activity-agnostic content descriptors are then used to search 422 the indexes 414 for matched videos through a comparison process 424, wherein candidate content descriptors 426 are retrieved from the indexed data storage 311. Ranked videos 428 are returned to the user through the user interface 310. User feedback can be provided to the initial matched video results produced by the system, and be used to refine the search via a "relevance feedback" route 430, as described for the query refinement process above. This is an interactive and iterative approach to quickly narrow down the videos that the user is interested in until the search results are satisfactory to the user.

A separate function referred to as alert mode 404 can be provided by the system described herein, which will utilize a user-provided query clip 416 and its associated generated descriptors 420 to match an input 432 from live video streams. The live video 432 undergoes processing by a pre-processing module 434 and activity descriptor generation 436 to describe the activity and object contents of the live video 432. The generated descriptors 420 and 436 from both the query and the live video, respectively, are then compared 438 to provide an alert 440 to a user when a match (i.e., similar events or activities between the two videos) is located. This provides capability to monitor live video for activities and events of interest using the same activity descriptors that the index and search system uses. This design not only reduces the software system complexity, but also allows improvements in descriptor design and similarity matching to benefit the alert mode 404 of operation directly with minimal additional development. In addition, once a user has defined an archive query, it can easily be used to set up a standing alert, and vice versa. Combined together, the multi-level activity-agnostic content description, hierarchical and graph-based indexing, activity-based search, and active learning for query refinement provide comprehensive, efficient and effective video search capability, which does not require supervised training to operate.

Figure 5:
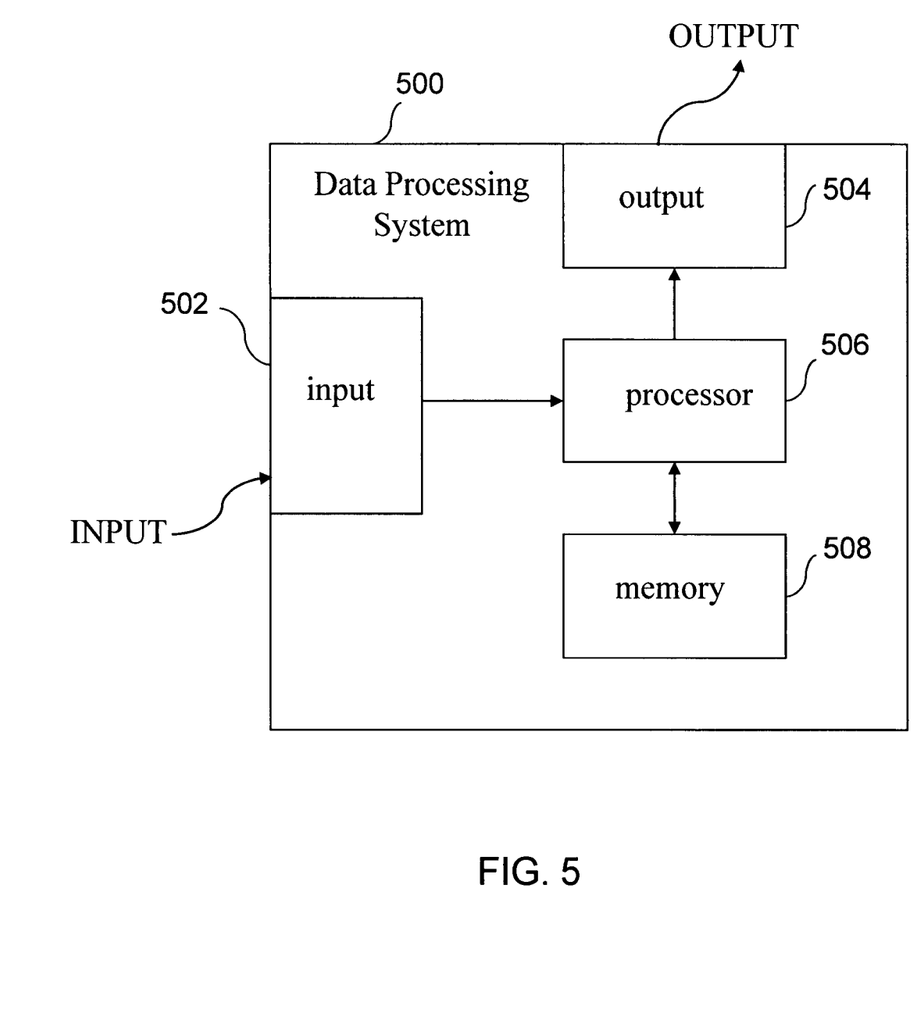
FIG. 5 is an illustration of a data processing system according to the present invention.

FIG. 5 illustrates a block diagram depicting components of a data processing system 500 (e.g., computer) incorporating the operations of the method described above. The method utilizes a data processing system 500 for storing computer executable instructions for causing a processor to carry out the operations of the above described method. The data processing system 500 comprises an input 502 for receiving information from a user. Information received may include input from devices such as cameras, scanners, keypads, keyboards, microphone, other peripherals such as storage devices, other programs, etc. The input 502 may include multiple "ports." An output 504 is connected with a processor 506 for providing information for transmission to other data processing systems, to storage devices, to display devices such as monitors, to generating information necessary for delivery, and to other mechanisms for presentation in user-usable forms. The input 502 and the output 504 are both coupled with the processor 506, which may be a general-purpose computer processor or a specialized processor designed specifically for use with the present invention. The processor 506 is coupled with a memory 508 to permit storage of data and software to be manipulated by commands to the processor 506.

Figure 6:
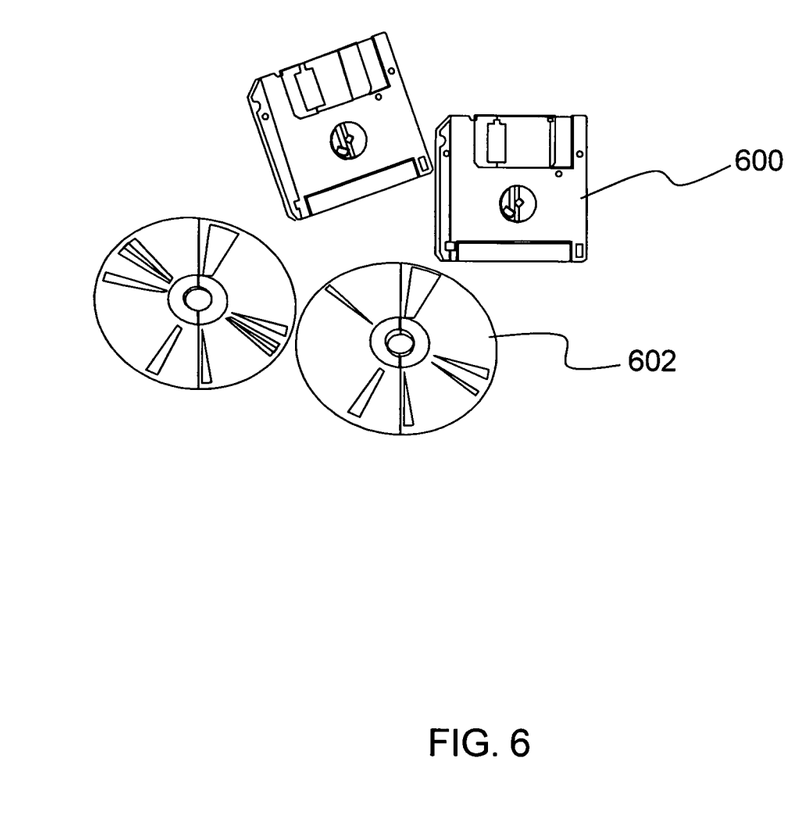
FIG. 6 is an illustration of a computer program product according to the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents instruction means (i.e., computer readable code) stored on any compatible computer readable medium.

What is claimed is:

1. A system for content recognition, search, and retrieval in visual data, the system comprising one or more processors configured to perform operations of:
   receiving unlabeled visual data as an input;
   extracting a set of activity-agnostic content descriptors from the unlabeled, visual data with a hierarchical content descriptor module having a plurality of levels, resulting in a set of generated activity-agnostic content descriptors, wherein each level of the hierarchical content descriptor module generates a distinct set of activity-agnostic content descriptors;

indexing the generated activity-agnostic content descriptors with a hierarchical content indexing module having a plural of levels corresponding to the plurality of levels of the hierarchical content descriptor module, resulting in a set of indexed content descriptors;

wherein each level of the content indexing module comprises a distinct set of indexed content descriptors from a corresponding level in the hierarchical content descriptor module;

storing the unlabeled visual data, the set of generated activity-agnostic content descriptors, and the set of indexed content descriptors in a storage module;

searching the storage module and retrieving visual data containing, a content of interest based on a user query;

refining the user query based on feature weighting; and presenting the visual data containing the content of interest to the user.

2. The system for content recognition, search, and retrieval in visual data as set forth in claim 1, wherein the query is an unlabeled video clip containing a content of interest.

3. The system for content recognition, search, and retrieval in visual data as set forth in claim 2, wherein the system is further configured to compare a set of generated activity-agnostic content descriptors from the unlabeled video clip to the set of generated activity-agnostic content descriptors in the storage module to retrieve a match.

4. The system for content recognition, search, and retrieval in visual data as set forth in claim 3, wherein the hierarchical content descriptor module comprises a first level for detecting a set of salient spatiotemporal regions which are abstracted into a set of activity-agnostic spatiotemporal visual words, wherein a collection of each of the sets of activity-agnostic spatiotemporal visual words form a visual vocabulary.

5. The system for content recognition, search, and retrieval in visual data as set forth in claim 4, wherein the hierarchical content descriptor module comprises a second level for modeling a set of motion trajectories of at least one moving object or salient blob in the unlabeled visual data.

6. The system for content recognition, search, and retrieval in visual data as set forth in claim 5, wherein the hierarchical content descriptor module comprises a third level which employs a set of graphical activity representations.

7. A computer-implemented method for content recognition, search, and retrieval in visual data, the method comprising an act of causing a processor to perform operations of:

receiving unlabeled visual data as an input;

extracting a set of activity-agnostic content descriptors from the unlabeled visual data with a hierarchical content descriptor module having a plurality of levels, resulting in a set of generated activity-agnostic content descriptors, wherein each level of the hierarchical content descriptor module generates a distinct set of activity-agnostic content descriptors;

indexing the generated activity-agnostic content descriptors with a hierarchical content indexing module having a plurality of levels corresponding to the plurality of levels of the hierarchical content descriptor module, resulting in a set of indexed content descriptors;

wherein each level of the content indexing module comprises a distinct set of indexed content descriptors from a corresponding level in the hierarchical content descriptor module;

storing the unlabeled visual data, the set of generated activity-agnostic content descriptors, and the set of indexed content descriptors in a storage module;

searching the storage module and retrieving visual data containing a content of interest based on a user query;

refining the user query based on feature weighting; and presenting the visual data containing the content of interest to the user.

8. The method for content recognition, search, and retrieval in visual data as set forth in claim 7, wherein the query is an unlabeled video clip containing a content of interest.

9. The method for content recognition, search, and retrieval in visual data as set forth in claim 8, further comprising an act of comparing a set of generated activity-agnostic content descriptors from the unlabeled video clip to the set of generated activity-agnostic content descriptors in the storage module to retrieve a match.

10. The method for content recognition, search, and retrieval in visual data as set forth in claim 9, wherein the hierarchical content descriptor module comprises a first level for detecting a set of salient spatiotemporal regions which are abstracted into a set of activity-agnostic spatiotemporal visual words, wherein a collection of each of the sets of activity-agnostic spatiotemporal visual words form a visual vocabulary.

11. The method for content recognition, search, and retrieval in visual data as set forth in claim 10, wherein the hierarchical content descriptor module comprises a second level for modeling a set of motion trajectories of at least one moving object or salient blob in the unlabeled visual data.

12. The method for content recognition, search, and retrieval in visual data as set forth in claim 11, wherein the hierarchical content descriptor module comprises a third level which employs a set of graphical activity representations.

13. A computer program product for content recognition, search, and retrieval in visual data, the computer program product comprising computer-readable instruction means stored on a computer-readable medium that are executable by a computer having a processor for causing the processor to perform operations of:

receiving unlabeled visual data as an input;

extracting a set of activity-agnostic content descriptors from the unlabeled visual data with a hierarchical content descriptor module having a plurality of levels, resulting in a set of generated activity-agnostic content descriptors, wherein each level of the hierarchical content descriptor module generates a distinct set of activity-agnostic content descriptors;

indexing the generated activity-agnostic content descriptors with a hierarchical content indexing module having a plurality of levels corresponding to the plurality of levels of the hierarchical content descriptor module, resulting in a set of indexed content descriptors;

wherein each level of the content indexing module comprises a distinct set of indexed content descriptors from a corresponding level in the hierarchical content descriptor module;

storing the unlabeled visual data, the set of generated activity-agnostic content descriptors, and the set of indexed content descriptors in a storage module;

searching the storage module and retrieving visual data containing a content of interest based on a user query;

refining the user query based on feature weighting; and presenting the visual, data containing the content of interest to the user.

14. The computer program product for content recognition, search and retrieval in visual data as set forth in claim 13, wherein the query is an unlabeled video clip containing a content of interest.

15. The computer program product for content recognition, search, and retrieval in visual data as set forth in claim 14, further comprising instruction means for comparing a set of generated activity-agnostic, content descriptors from the unlabeled video clip to the set of generated content activity-agnostic descriptors in the storage module to retrieve a match.

16. The computer program product for content recognition, search, and retrieval in visual data as set forth in claim 15, wherein the hierarchical content descriptor module comprises a first level for detecting, a set of salient spatiotemporal regions which are abstracted into a set of activity-agnostic spatiotemporal visual words, wherein a collection of each of the sets of the activity-agnostic spatiotemporal visual words form a visual vocabulary.

17. The computer program product for content recognition, search, and retrieval in visual data as set forth in claim 16, wherein the hierarchical content descriptor module comprises a second level for modeling a set of motion trajectories of at least one moving object or salient blob in the unlabeled visual data.

18. The computer program product for content recognition, search, and retrieval in visual data as set forth in claim 17, wherein the hierarchical content descriptor module comprises a third level which employs a set of graphical activity representations.

* * * * *